(No Model.) 2 Sheets—Sheet 1.

C. MILLS.
PHOTOGRAPHIC CAMERA.

No. 458,128. Patented Aug. 18, 1891.

WITNESSES:
Edward C. Rowland
Charles Ryder

INVENTOR
Charles Mill,
BY Phillips Abbott
ATTORNEY (No Model.) 2 Sheets—Sheet 2.

C. MILLS.
PHOTOGRAPHIC CAMERA.

No. 458,128. Patented Aug. 18, 1891.

WITNESSES:
Edward C. Rowland
Charles Ryder

INVENTOR
Charles Mills
BY Phillip Abbott
ATTORNEY

UNITED STATES PATENT OFFICE.

CHARLES MILLS, OF NEW YORK, N. Y., ASSIGNOR TO THE E. & H. T. ANTHONY & COMPANY, OF SAME PLACE.

PHOTOGRAPHIC CAMERA.

SPECIFICATION forming part of Letters Patent No. 458,128, dated August 18, 1891.

Application filed February 24, 1891. Serial No. 382,616. (No model.)

*To all whom it may concern:*

Be it known that I, CHARLES MILLS, a subject of the Queen of Great Britain, and a resident of New York city, in the county of New York and State of New York, have invented certain new and useful Improvements in Photographic Cameras, of which the following is a specification.

My invention relates to improvements in photographic cameras; and it consists, generally stated, in the addition to the camera of certain devices whereby the necessity for a dark-room is done away with, also means whereby any desired number of plates, whether exposed or not exposed, may be carried in the camera protected from the light, and also devices whereby the camera may be collapsed for more convenient transportation.

Figure 1:
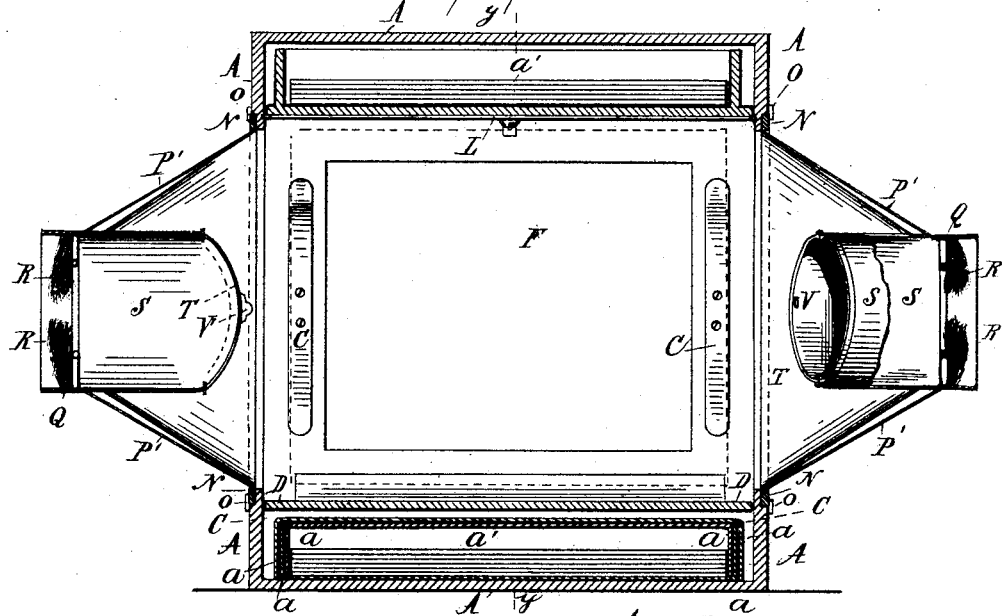
Figure 2:
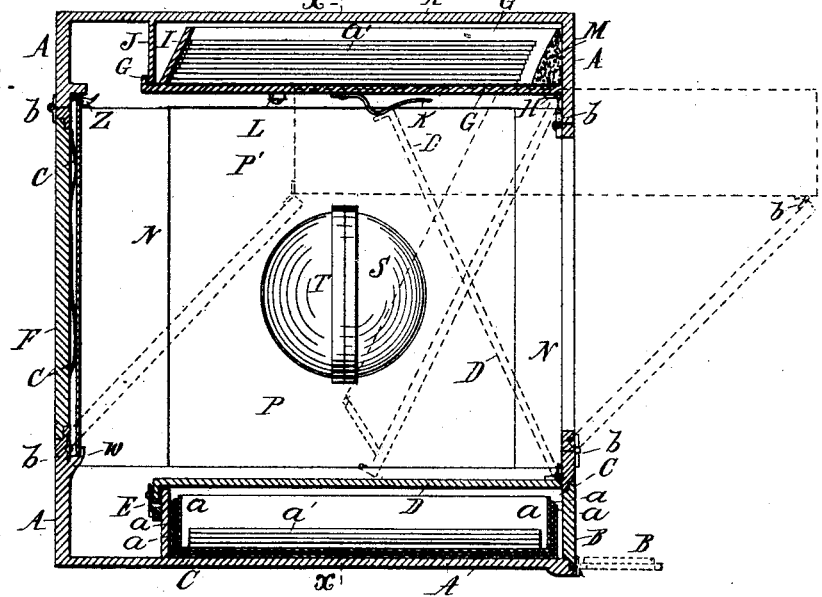
Figure 3:
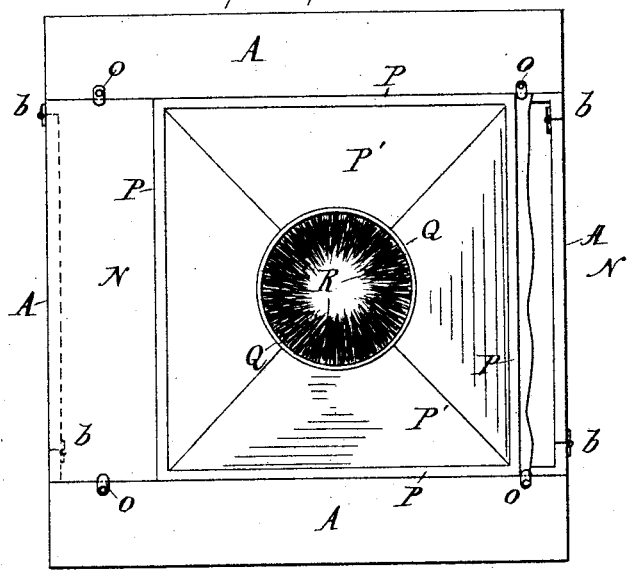
Figure 4:
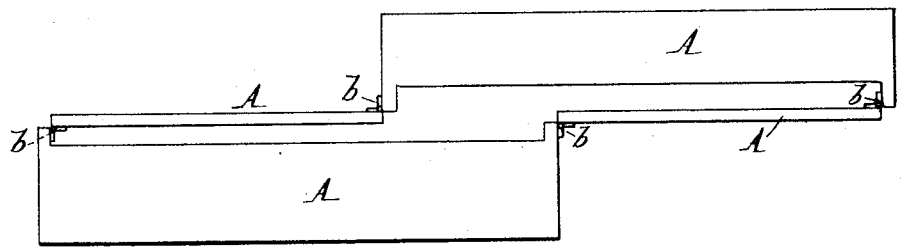

Figure 1 illustrates a vertical section on a line at right angles to the axis of the lens and on the line $xx$ of Fig. 2. Fig. 2 illustrates a vertical section on a line through the lens and ground glass or sensitive plate and on the line $yy$ of Fig. 1, showing also in dotted lines the position of the cover for the storage-chamber when opened and of the plate-chamber when dropped; also showing in dotted lines the position assumed by the parts when in the act of collapsing. Fig. 3 illustrates a side elevation of the camera partly broken away and showing the method of bringing the parts together so that they may collapse, and also showing the means for confining the pocket-frames to the side of the camera. Fig. 4 illustrates the camera as collapsed.

A A is the frame proper of the camera. It may be made of such material as preferred.

B is a little door which extends across the front lower part of the camera and opens into a chamber C, which has a hinged cover D, confined by a hasp E.

F is a removable back board.

G is a box occupying the upper part of the camera. It is hinged at H, and has a front piece or ledge I, placed at an angle, as shown.

J is a false front rigidly attached to the top of the camera.

K is a spring attached to the under side of the box G.

L L are hasps of any suitable construction for holding the box G in the upper part of the camera when it is elevated.

M is a pad of any suitable material. It may be fastened to the front end of the camera, or to the box G, as preferred. Its side toward the interior of the box is preferably arranged on a bevel, as shown, to conform to that of the ledge I.

N N are two frames equal in length to the width of the sides of the camera, but of less width. They are detachably attached to the sides of the camera by buttons O O O O.

P P are strips of molding or other suitable means whereby the edges of conically-shaped bags P' P' of flexible light-excluding material—such as bellows-cloth—are fastened to the frames N N. At the small ends of these two conical bags, which, as shown, are arranged on opposite sides of the camera, are what I term "wristlets" Q Q. They are narrow bands of material—such as rubber, wood, or metal—and may be elastic, if desired. They are of such size as to easily admit a man's hand, and their interior surface is heavily lined with some black, or at least dark, material R, such as dyed lamb's wool or the like. This material projects almost to the center of the wristlets, so that when the hand is inserted it closes about the wrist and completely excludes light.

S S are what I term "pockets." They are bags preferably of flexible material adapted to easily contain a man's hand, and at their inner ends or bottom parts there are attached ordinary fish-mouthed or purse frames T T, except that the device whereby one of them at least is held shut is arranged to be manipulated from the inside of the pocket, as seen at V, Fig. 1. The other one, as shown at V', Fig. 1, may be manipulated from the exterior, as usual. They are of such size as to allow the passage of a man's hand.

W is a rabbeted ledge for the support of the lower edge of the ground glass or sensitive plate, as the case may be, and Z is a spring-hook, the face of the hook being on the same plane as the rabbet on the ledge.

$a\ a\ a$ are the several paper or other boxes in which dry plates are received from the manufacturer. As well known, they are reversely mated into each other to exclude the light, the seam or joint of the outer one being sealed light-tight by a strip of paper pasted over it.

$a'$ $a'$, &c., are the plates.

$b$ $b$ $b$ $b$ are hinges by which the several parts of the frame are hinged together and whereby it may be collapsed, as hereinafter set forth. They (the hinges) are of course in each instance arranged in pairs.

$c$ $c$ are springs to press the plates or ground glass into the proper focal position as used in such structures.

All the parts of the camera at which a joint occurs through which light might enter are preferably made light-tight by padding or by rabbets. (Not shown.) The lens is of course attached in any suitable manner to the front of the box opposite the ground glass.

The operation is as follows: The box containing the dry plates just as it comes from the manufacturer is first adapted to be opened by cutting the strip of paper all around. It is then passed through the little door B into the chamber C in the bottom of the camera. This chamber I will call the "storage-chamber." The door B is then closed and fastened. The hands are then introduced through the wristlets Q into the pockets S, the lamb's wool making light-tight connection at the wrists. The fish-mouth frame T, which has its lock on the inside, is then opened and the hand thrust through it, and by it the other fish-mouth frame is opened, and the other hand is then likewise thrust through it. Thus both hands are on the inside of the camera, and no light has entered it or can enter it. The operator then manipulates the device on the interior of the camera, and also the camera itself, as follows, being aided in so doing by the flexible character of the conical bags P', which afford him freedom of movement: He lifts the cover D of the storage-chamber and catches it under the spring K, so that it is held elevated, as shown in dotted lines in Fig. 2. He then picks up the boxes of plates and, removing them one by one, nests them into each other again instead of having them within each other reversely. In other words, he arranges them as shown in Fig. 2 instead of being, as they originally were, as shown in Fig. 1. He then lifts all of the plates out from the innermost box $a$ and leans them up against the ground-glass plate or some other suitable place. Then he shuts the cover D, and then, pressing the latches L L, lowers the upper box or chamber G (which I will call the "plate-chamber") into the position shown in dotted lines in Fig. 2, and then places all the plates in that box, the inclined ledge I of which causes them to assume an "offset" position relative to each other, so that they can be easily removed from the box, the fingers of the operator easily distinguishing and utilizing the projecting upper edge of the outermost plate. Now to make an exposure he takes one of the plates and places it on the rabbet W and swings its upper edge rearwardly until it catches under the hook Z, and then elevates the box G again out of the way. The focus has of course been already determined and the subject found by a finder or otherwise and the shutter operated by squeezing the bulb in the usual manner. The bulb of course is or may be located within the camera, that it may be grasped by the hand of the operator. The picture being taken, the plate is removed and deposited in the storage-chamber C by lifting its cover, as before. The plate-chamber is then again lowered and a new plate put in position ready for another exposure. This operation is repeated until all the plates have been exposed. They are then removed by being again placed in the boxes, arranged reversely or otherwise, as desired, depending upon whether they are to be removed from the camera in a dark-room or not. While withdrawing the hands from the pockets care should be observed to first close the fish-mouths T. To collapse the camera the side frames N N are unbuttoned and are removed and placed crosswise within the frame. It is then pushed over, after the fashion of a pair of parallel rules, into the position shown in Fig. 4, the side frames N N being accommodated by a set-off in the location of the hinges $b$ $b$, &c., as shown.

I do not limit myself to the details of construction shown, because alterations may be made therein and still the essentials of the invention be employed, and it is obvious that provision may be made for the insertion of one hand only within the camera, if preferred.

I claim—

1. A camera having a light-tight plate-chamber and a light-tight storage-chamber each adapted to be opened from the interior of the camera, and means whereby the hand of the operator may be inserted to the interior of the camera without admitting light, substantially as set forth.

2. In a camera, interiorly-located receptacles or places for the exposed and unexposed plates, and means whereby the hand of the operator may be passed to the interior of the camera without admitting light, substantially as set forth.

3. In a camera, interiorly-located receptacles or places for the exposed and unexposed plates, and a flexible side for the camera provided with means for the passage of the hand through it and for excluding the light, substantially as set forth.

4. A camera having a storage-chamber accessible from the interior and exterior of the camera and a plate-chamber accessible from the interior of the camera only, substantially as set forth.

5. A camera having sides made of flexible material, a pocket arranged therein through which the hand may be inserted to the interior of the camera, provided with means to exclude the light, and a storage-chamber and plate-chamber both accessible from the interior of the camera, substantially as set forth.

6. The combination, in a camera, of a storage-chamber provided with a door connecting with the exterior of the camera and having a movable cover, and a hinged plate-chamber adapted to move bodily on its hinges and means to hold it in position when closed, substantially as set forth.

7. A camera having a separate box or receptacle for the plates at its upper and lower parts and removable frames at its sides, which sustain flexible panels, provided with means for the insertion of the hand of the operator without admitting light, and means, such as hinges, placed on the frame of the camera between the said boxes, whereby the camera may be folded or collapsed, substantially as set forth.

8. A camera having a box for the reception of the plates opening both to the interior of the camera and to the exterior thereof, and another box for the same purpose opening to the interior of the camera only, and frames which sustain flexible sides provided with pockets having light-excluding devices at their ends, and means to sustain the plates in proper focal position adapted to be operated from the interior of the camera, substantially as set forth.

Signed at New York, in the county of New York and State of New York, this 20th day of February, A. D. 1891.

CHARLES MILLS.

Witnesses:
PHILLIPS ABBOTT,
J. E. HOFFMAN.